United States Patent
Liu et al.

(10) Patent No.: US 11,134,815 B2
(45) Date of Patent: Oct. 5, 2021

(54) BOX-TYPE DUST COLLECTOR

(71) Applicant: MAKITA CORPORATION, Anjo (JP)

(72) Inventors: Shulin Liu, Jiangsu (CN); Zheng Wang, Jiangsu (CN); Haowei Mei, Jiangsu (CN); Takayuki Tahara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 287 days.

(21) Appl. No.: 16/417,111

(22) Filed: May 20, 2019

(65) Prior Publication Data

US 2019/0380549 A1 Dec. 19, 2019

(30) Foreign Application Priority Data

Jun. 13, 2018 (CN) .......................... 201810607085.8

(51) Int. Cl.
| | | |
|---|---|---|
| *B01D 46/00* | (2006.01) |
| *B01D 46/24* | (2006.01) |
| *B01D 46/42* | (2006.01) |
| *A47L 9/00* | (2006.01) |
| *A47L 9/14* | (2006.01) |
| *A47L 9/28* | (2006.01) |
| *A47L 9/32* | (2006.01) |
| *A47L 5/36* | (2006.01) |

(52) U.S. Cl.
CPC .............. *A47L 5/36* (2013.01); *A47L 9/1409* (2013.01); *A47L 9/327* (2013.01); *B01D 46/0002* (2013.01); *B01D 46/24* (2013.01); *B01D 46/4227* (2013.01); *B01D 2279/55* (2013.01)

(58) Field of Classification Search
CPC ................ B01D 46/0002; B01D 46/24; B01D 46/2411; B01D 46/4227; B01D 2273/30; A47L 5/36; A47L 9/1409; A47L 9/327; A47L 9/127; A47L 9/2884; A47L 9/2842; A47L 9/322; A47L 9/00; A47L 9/22
USPC ..... 55/357, 385.1, 473, DIG. 3; 15/347, 353
See application file for complete search history.

(56) References Cited

U.S. PATENT DOCUMENTS 3,858,272 A * 1/1975 Bard ....................... A47L 9/327
16/405
3,861,894 A * 1/1975 Marsh .................... B01D 46/12
96/121

(Continued)

FOREIGN PATENT DOCUMENTS

EP 728435 A1 8/1996

*Primary Examiner* — Minh Chau T Pham
(74) *Attorney, Agent, or Firm* — Oliff PLC (57) ABSTRACT

A box-type dust collector includes a suction unit that includes a brushless motor and an air blowing fan, a battery mount portion, to which a battery pack that serves as a power source is mountable, a suction port that suctions outside air through rotation of the air blowing fan, and a filter that separates dust from the outside air which is suctioned from the suction port. The bottom surface of a tank serves as a surface for stationary placement. A handle for carriage is provided at a position directly over the center of gravity of the entire box-type dust collector with the battery pack mounted to the battery mount portion. Coupling portions to be coupled to both ends of a shoulder belt are provided at front and rear positions that are point-symmetric about the center of gravity as viewed in plan.

17 Claims, 11 Drawing Sheets

(56) References Cited

U.S. PATENT DOCUMENTS

| | | | | |
|---|---|---|---|---|
| 4,643,748 A | * | 2/1987 | Dyson | A47L 9/1633 55/338 |
| 4,853,008 A | * | 8/1989 | Dyson | A47L 9/1633 55/345 |
| 5,062,870 A | * | 11/1991 | Dyson | B04C 11/00 96/400 |
| 5,090,976 A | * | 2/1992 | Dyson | A47L 9/1418 55/337 |
| 2009/0265882 A1 | * | 10/2009 | Rhea | A47L 5/365 15/350 |
| 2012/0144787 A1 | * | 6/2012 | Joo | A47L 9/182 55/357 |
| 2013/0192181 A1 | * | 8/2013 | Ackermann | B01D 46/2411 55/357 |
| 2015/0113924 A1 | * | 4/2015 | Mathews | B01D 46/12 55/357 |
| 2015/0113925 A1 | * | 4/2015 | Gatica | B01D 35/30 55/357 |
| 2015/0377191 A1 | * | 12/2015 | Uezu | B01D 46/0023 55/357 |

\* cited by examiner

BOX-TYPE DUST COLLECTOR

BACKGROUND

This application claims the benefit of Chinese Patent Application Number 201810607085.8 filed on Jun. 13, 2018, the entirety of which is incorporated by reference.

Technical Field

The present invention relates to a box-type dust collector, on which a battery that serves as a power source is mounted.

Related Art

A box-type dust collector includes a suction unit that includes a motor and an air blowing fan, a suction port that suctions outside air through rotation of the air blowing fan, and a separation portion that separates dust from the outside air which is suctioned from the suction port. Such constituent elements are housed in a box-type housing. European Patent Application Publication No. 728435 discloses a box-type dust collector that includes a cyclone separator as the separation portion and a battery as the power source. In the dust collector, dust is separated and stored in a housing when air suctioned from a suction port passes through a path that leads to the cyclone separator.

Such box-type dust collectors are typically used in a stationary manner in order to collect dust via a hose and a nozzle connected to the suction port, or collect powder dust or the like generated by the use of an electric power tool connected to the hose. It should be noted, however, that the box-type dust collector according to European Patent Application Publication No. 728435 can be used in the state of being suspended from a belt of a worker using a belt clip provided to the housing.

SUMMARY

In the box-type dust collector according to European Patent Application Publication No. 728435, however, the battery is provided to project outward from the outer surface of the housing in a circular column shape. Further, the belt clip is provided on the outer surface of the housing in a different phase from that of the battery. Hence, the box-type dust collector is not well-balanced when carried utilizing the belt clip, and is tilted etc. during transportation or during work, which degrades workability.

Thus, it is an object of the present invention to provide a box-type dust collector with high workability that can be carried in a well-balanced manner even if a battery is used as a power source.

In order to achieve the above object, a first aspect of the present invention provides a box-type dust collector including a suction unit that includes a motor and an air blowing fan, a battery mount portion, to which a battery that serves as a power source is mountable, a suction port that suctions outside air through rotation of the air blowing fan, a separation portion that separates dust from the outside air which is suctioned from the suction port, a bottom surface that serves as a surface for stationary placement, in which a handle for carriage is provided at one of a position directly over a center of gravity of the entire box-type dust collector with the battery mounted to the battery mount portion and positions that are point-symmetric about the center of gravity as viewed in plan.

In this case, preferably, coupling portions, to which both ends of a shoulder belt are to be coupled, are provided at positions that are point-symmetric about the center of gravity as viewed in plan.

Preferably, the box-type dust collector further includes a tank that has the surface for stationary placement as the bottom surface and that stores the dust which is separated by the separation portion, and a body placed on the tank and including the suction unit and the battery mount portion, and the tank is provided with a grip that projects outward so as to support a dust collection hose to be connected to the suction port.

Preferably, the body includes a controller that controls drive of the motor, and the controller is cooled with cooling air from a motor cooling fan provided on a rotary shaft of the motor.

Preferably, the handle includes a linear grip portion and a pair of leg portions formed integrally with both ends of the grip portion, lower ends of the leg portions are coupled to the body so as to be rotatable, and the grip portion is positioned directly over the center of gravity when the leg portions are at upright positions.

Preferably, the tank has a deep bottomed half box body with an opening in an upper surface, the body has a bottom cover placed at an upper end of the tank and a top cover assembled to the bottom cover from an upper side, and the top cover is provided with a handle accommodation portion that accommodates the handle at a fallen position.

Preferably, the top cover is provided with a finger insertion portion that facilitates drawing out the handle to an upright position.

Preferably, the battery mount portion is provided on the bottom cover, and the top cover is provided with a housing recessed portion that opens the battery mount portion.

Preferably, the top cover is provided with a cover that opens and closes the housing recessed portion.

Preferably, the cover is allowed to open the housing recessed portion only in a case where the handle is at the fallen position.

Preferably, a pair of the coupling portions are provided with the handle interposed between the coupling portions.

Preferably, the coupling portions each includes a bottomed hole and a pin provided to extend in the bottomed hole.

Preferably, the pin is disposed on a line that is orthogonal to a line that extends in an up-down direction and that passes through the center of gravity.

Preferably, an intermediate plate that supports the separation portion is provided between the tank and the body, the intermediate plate is provided with a pocket that houses the dust collection hose, and the pocket is supported as fitted with the grip.

Preferably, the controller is supported vertically in the body.

Preferably, the separation portion is a tubular filter.

Preferably, the battery is slid from a side to be mounted to the battery mount portion.

According to the present invention, the handle for carriage is provided at a position directly over the center of gravity of the entire box-type dust collector with the battery mounted and/or at positions that are point-symmetric about the center of gravity as viewed in plan. Thus, the box-type dust collector can be carried in a well-balanced manner utilizing the handle even if the battery is used as the power source, and provides high workability.

DETAILED DESCRIPTION

An embodiment of the present invention will be described below with reference to the drawings.

First Embodiment

Figure 1:
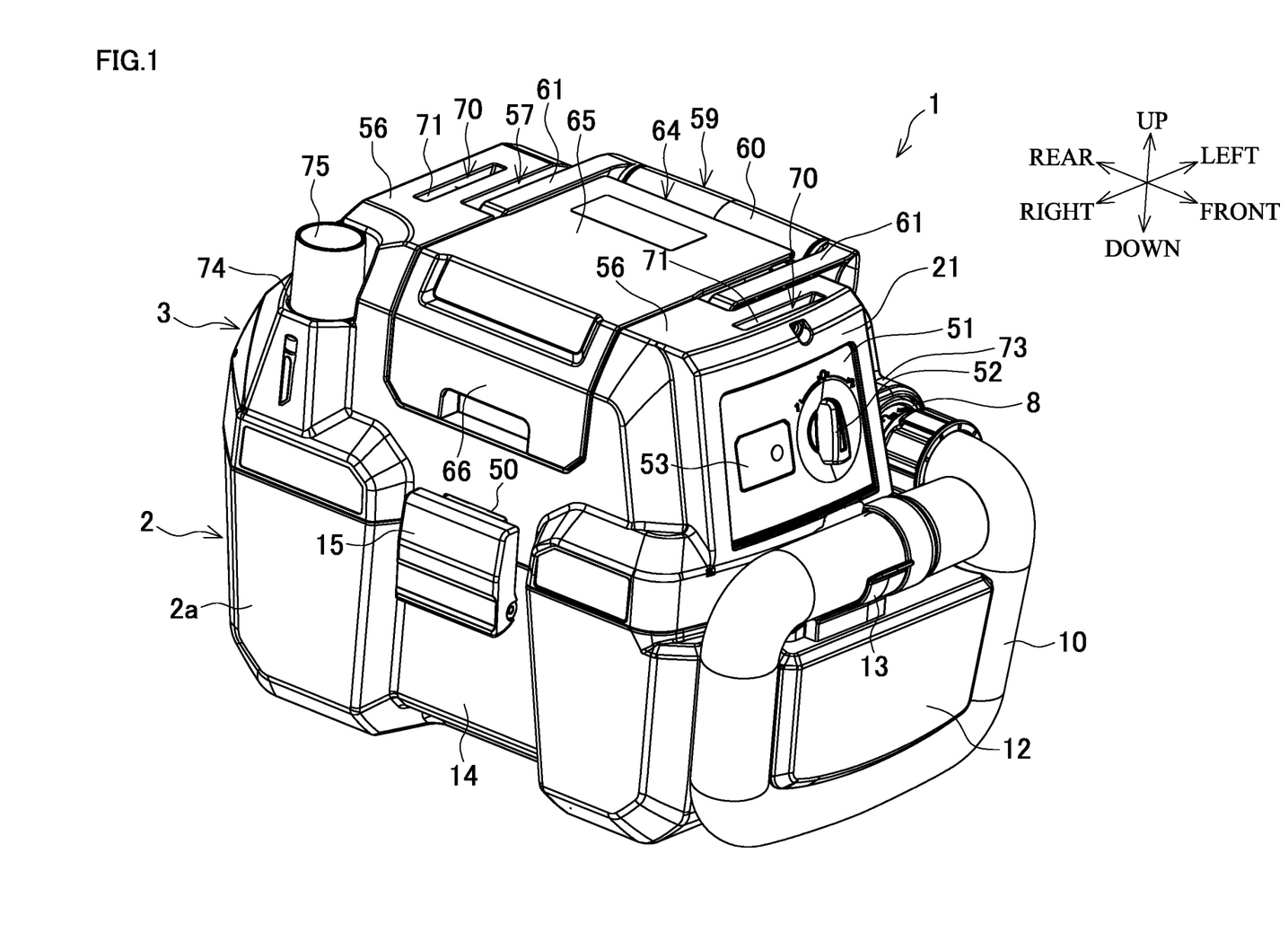
FIG. 1 is a perspective view of a box-type dust collector according to a first embodiment.

FIG. 1 is a perspective view illustrating an example of a box-type dust collector. A box-type dust collector (hereinafter referred to simply as a "dust collector") 1 has a box shape as a whole, in which a body 3 is placed on the upper side of a tank 2 provided on the lower side.

Figure 2:
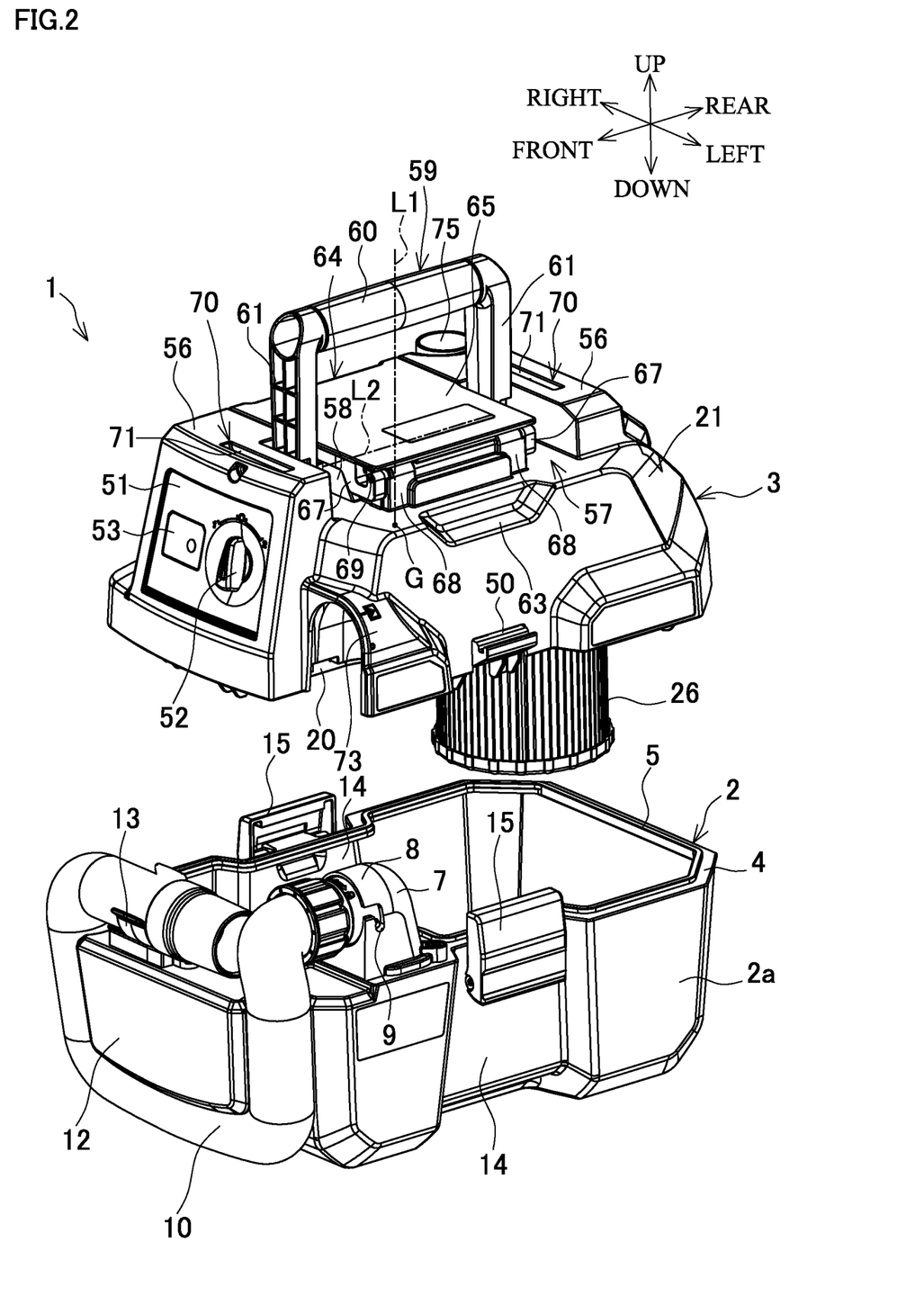
FIG. 2 is an exploded perspective view of the box-type dust collector according to the first embodiment.
Figure 3:
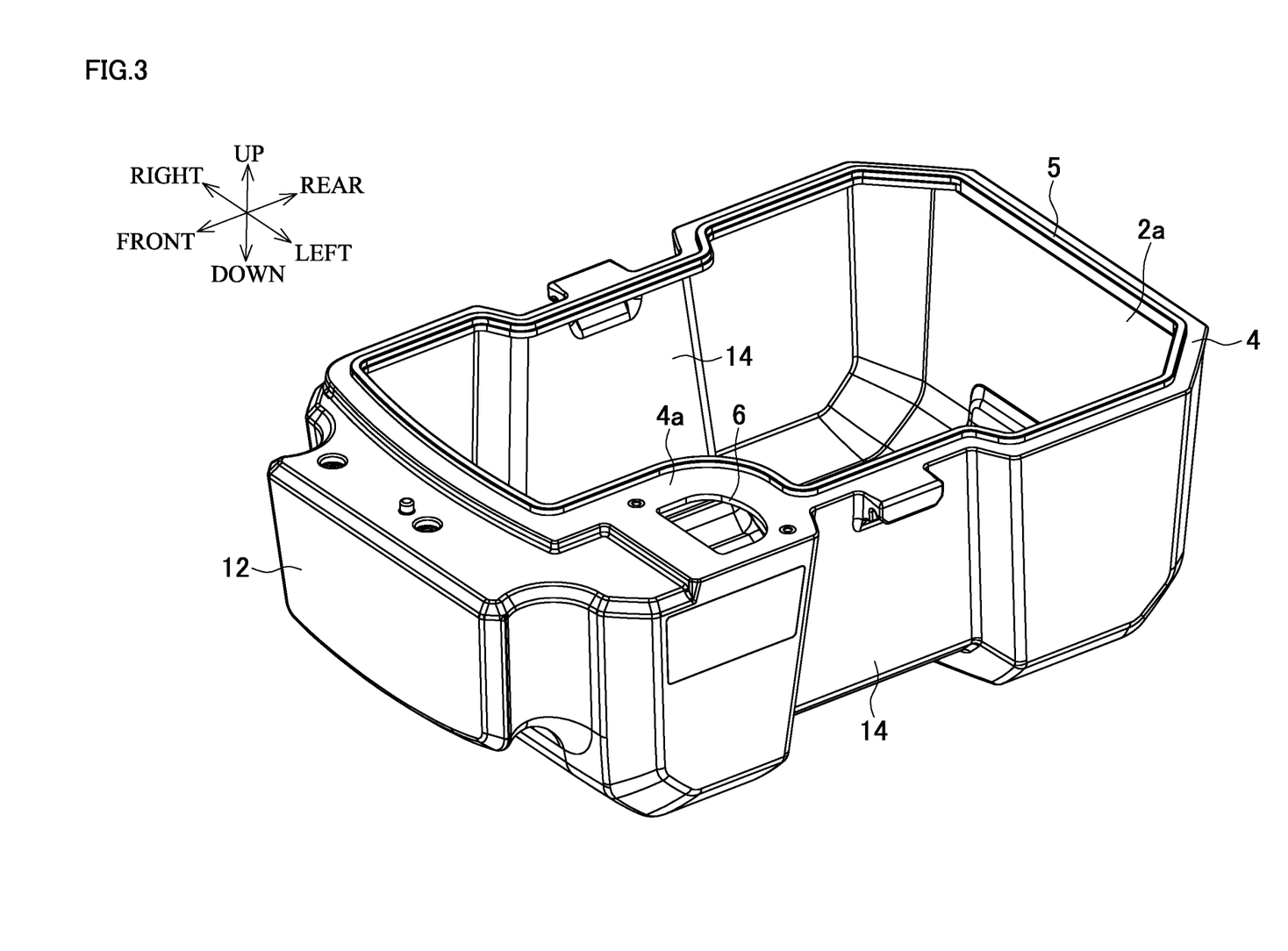
FIG. 3 is a perspective view of a tank body.
Figure 4:
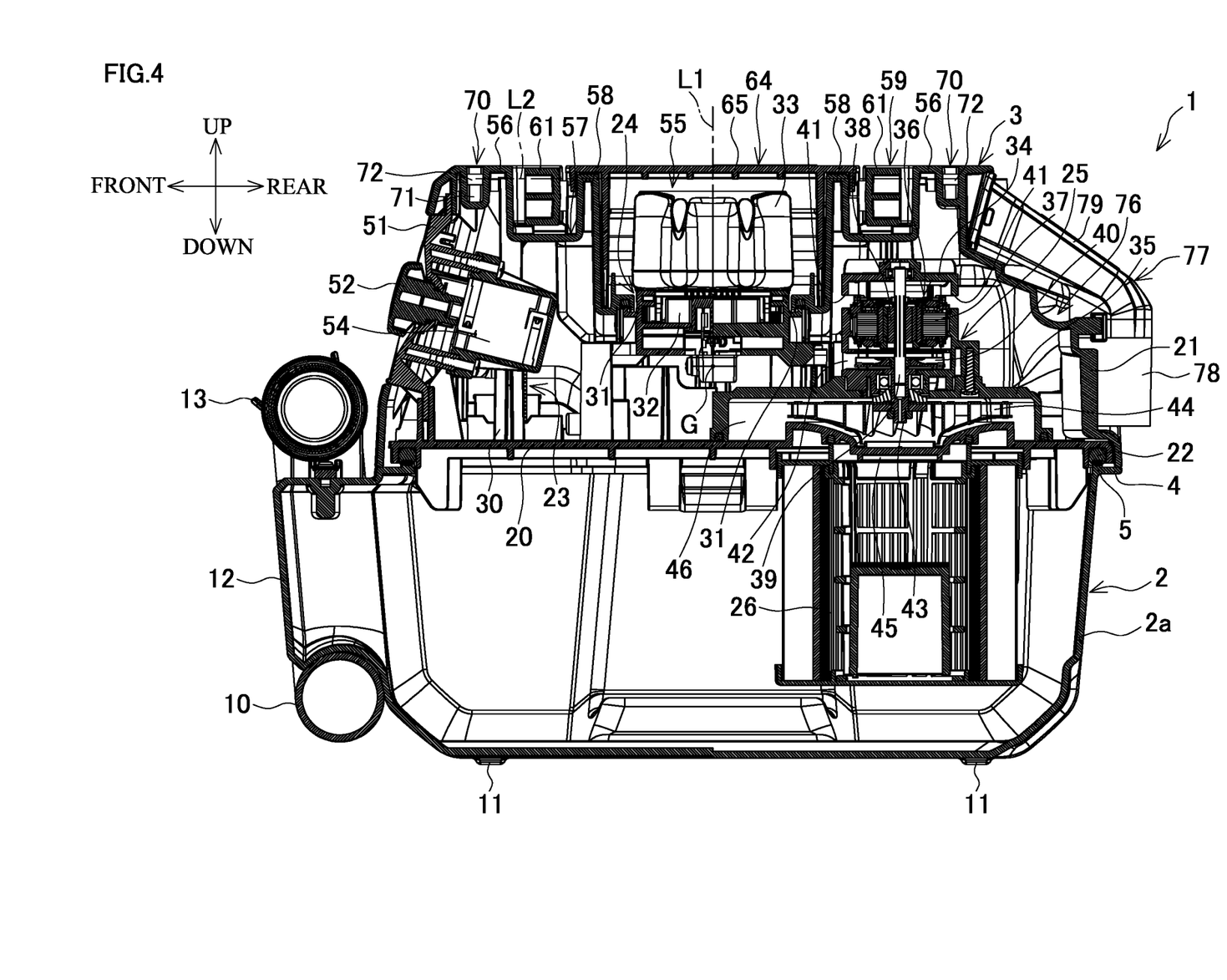
FIG. 4 is a vertical sectional view of the box-type dust collector according to the first embodiment, taken along a line that passes through the center of gravity thereof.

First, as illustrated in FIG. 2, the tank 2 is formed as a deep bottomed half box body with an opening in the upper surface thereof, and has a tank body 2a made of a resin and formed in a rectangular shape as viewed in plan that is longer in the front-rear direction. An overhanging portion 4 that projects inward in a bent shape is formed continuously over the entire periphery at the upper end of the opening of the tank body 2a. A rib 5 that extends along the shape of the overhanging portion 4 is formed on the upper surface of the overhanging portion 4. As illustrated in FIG. 3, the overhanging portion 4 includes a corner portion 4a which is formed to overhang inward significantly at the front left corner of the tank body 2a compared to other portions. A transparent hole 6 is formed in the corner portion 4a. A suction tube 7 is provided on the corner portion 4a. The lower end of the suction tube 7 penetrates the transparent hole 6, and the upper end thereof opens forward to form a suction port 8. The suction port 8 is provided with an engagement groove 9 for bayonet connection to the base end of a dust collection hose 10. Legs 11 are provided at the four corners of the bottom surface, which serves as a surface for stationary placement, of the tank body 2a (FIG. 4).

A hose winding portion 12 with a rectangular shape as viewed from the front is provided on the front surface of the tank body 2a. The right and left side surfaces and the lower surface of the hose winding portion 12 are curved surfaces that match the outer peripheral surface of the dust collection hose 10. A U-shaped receiving fitting 13 that elastically holds the distal end of the dust collection hose 10 is provided on the upper surface of the hose winding portion 12.

Hence, the dust collection hose 10 which is connected to the suction tube 7 can be accommodated on the front surface of the tank body 2a as illustrated in FIGS. 1 and 2, such that the dust collection hose 10 is wound around the hose winding portion 12 in the order of the left side surface, the lower surface, and the right side surface of the hose winding portion 12, and the distal end of the dust collection hose 10 is held by the receiving fitting 13 on the upper surface of the hose winding portion 12.

Recessed portions 14, 14 that project inward compared to the front and rear sides thereof are formed at the center, in the front-rear direction, of the right and left side surfaces of the tank body 2a. Latches 15, 15 for engagement with the body 3 are provided on the upper side of the outer surfaces of the recessed portions 14, 14.

Figure 5:
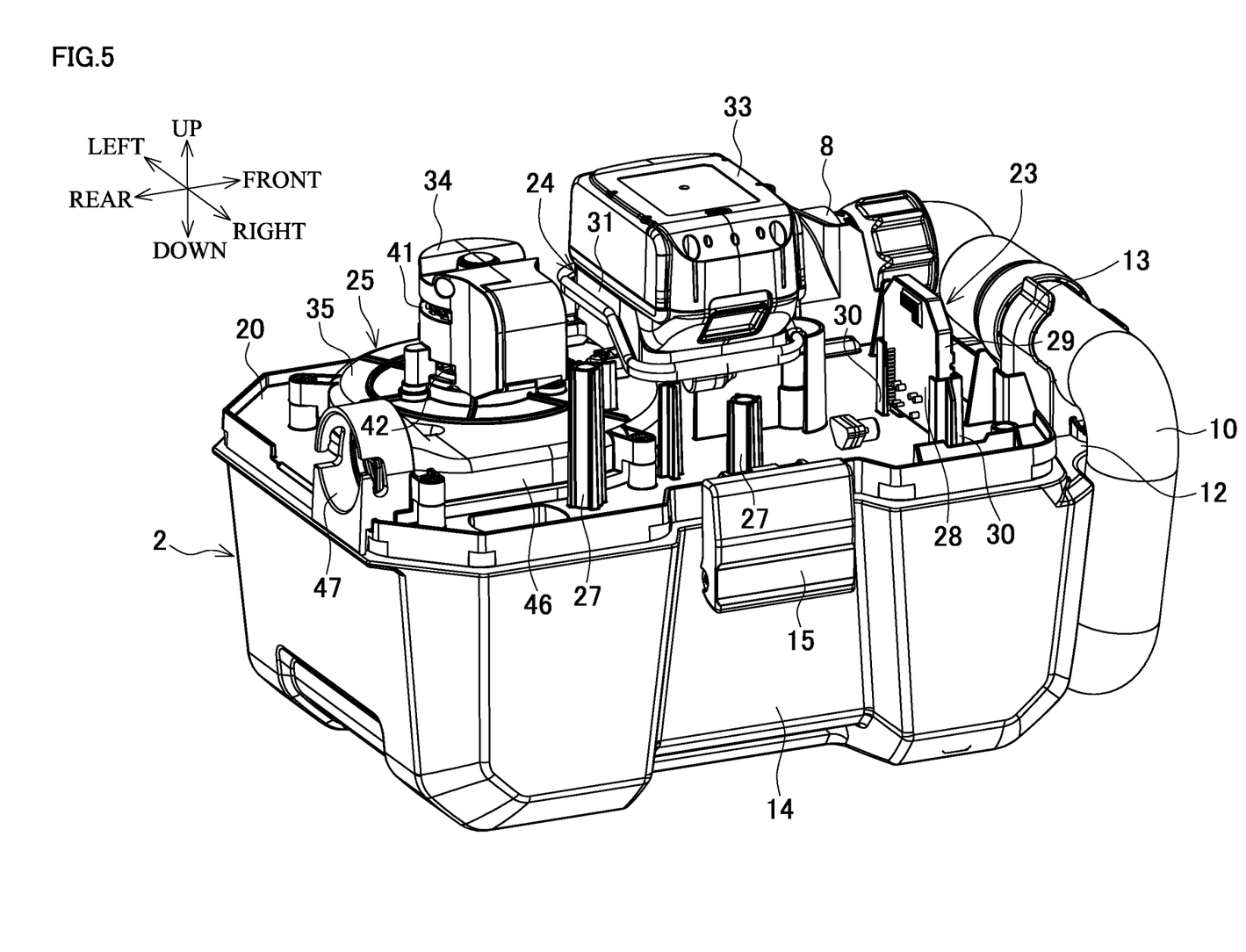
FIG. 5 is a perspective view of the box-type dust collector according to the first embodiment with a top cover removed.

Next, as illustrated in FIG. 4, the body 3 has a bottom cover 20 placed on the overhanging portion 4 of the tank 2, and a top cover 21 assembled to the bottom cover 20 from the upper side. The bottom cover 20 is made of a resin, and has a plate shape. A seal member 22 is held at the peripheral edge of the lower surface of the bottom cover 20. When the bottom cover 20 is placed on the overhanging portion 4, the seal member 22 abuts against the rib 5 to close the opening of the tank 2. As illustrated in FIG. 5, a controller 23, a battery mount portion 24, and a suction unit 25 are provided on the bottom cover 20 in this order from the front side. A tubular filter 26, which serves as a separation portion that communicates with the suction unit 25, is attached to the lower surface of the bottom cover 20 to extend downward. A plurality of bosses 27, to which the top cover 21 is to be screwed, are formed on the bottom cover 20 to extend upward.

The controller 23 includes a control circuit board 28, on which a microcomputer, switching elements for controlling a brushless motor 36 provided to the suction unit 25 are mounted, and a flat case 29 that holds the control circuit board 28. With the case 29 held by a pair of holding ribs 30, 30 provided on the right and left sides on the bottom cover 20, the controller 23 is supported on the bottom cover 20 to extend vertically along a plane defined in the up-down direction and the right-left direction.

The battery mount portion 24 includes a pair of guide rails 31, 31 provided on the front and rear sides to extend in the right-left direction. A terminal block 32 that includes a terminal strip is provided between the guide rails 31, 31 with the terminal strip facing upward. When a battery pack 33 that serves as a battery and that is also used for an electric power tool is slid from the right side to a space between the guide rails 31, 31 in the battery mount portion 24, the battery pack 33 is mounted between the guide rails 31, 31, and electrically connected to the terminal block 32. The battery pack 33 can be removed by sliding the battery pack 33 leftward.

The suction unit 25 includes a motor housing portion 34 on the upper side and a fan housing portion 35 on the lower side. The motor housing portion 34 houses the brushless motor 36, which is composed of a stator 37 and a rotor 38, with a rotary shaft 39 provided to the rotor 38 directed downward. A motor cooling fan 40 is provided on the rotary shaft 39 on the lower side of the stator 37. Cooling air inlet ports 41, 41 that open forward and rearward are formed on the upper side of the motor housing portion 34. Cooling air outlet ports 42, 42 that open forward and rearward are formed on the lower side of the cooling air inlet ports 41, 41 and on the outer side of the motor cooling fan 40.

An output shaft 43 coaxially coupled to the rotary shaft 39 of the brushless motor 36 projects into the fan housing portion 35. An air blowing fan 44 is integrally fixed to the output shaft 43. A sucking port 45 that communicates with the inside of the filter 26 is formed in the fan housing portion 35 directly under the center of the air blowing fan 44.

A turning path 46 in a swirling shape is formed in the fan housing portion 35 in the outer peripheral portion of the air blowing fan 44. The terminal end of the turning path 46 is connected to an exhaust port 47 provided at the rear end of the bottom cover 20.

The top cover 21 made of a resin has a deep bottomed shape with an opening at the lower end thereof to cover the bottom cover 20 from the outer side. Threaded bosses (not illustrated) are formed on the inner surface of the top cover 21 at positions corresponding to the bosses 27 of the bottom cover 20 to extend downward. Hence, the top cover 21 is assembled to the bottom cover 20 by inserting screws (not illustrated) into the bosses 27 of the bottom cover 20 with the top cover 21 covering the bottom cover 20 from the upper side. With the body 3 placed on the tank 2, as illustrated in FIG. 4, the lower end of the top cover 21 abuts against the upper surface of the overhanging portion 4 over the entire periphery on the outer side of the bottom cover 20. Latch receiving portions 50, 50 to be engaged with the latches 15, 15 of the tank 2 are provided on the right and left side surfaces of the top cover 21.

The front surface of the top cover 21 is formed to be inclined downward toward the front, and provided with an operation panel 51. The operation panel 51 includes an operation dial 52 and a display portion 53 for the remaining capacity of the battery pack 33. The operation dial 52 is provided in a switch 54 provided on the back side of the operation panel 51. The operation dial 51 enables selection of stop, operation 1 (small suction force), and operation 2 (large suction force) through a rotating operation.

Figure 6:
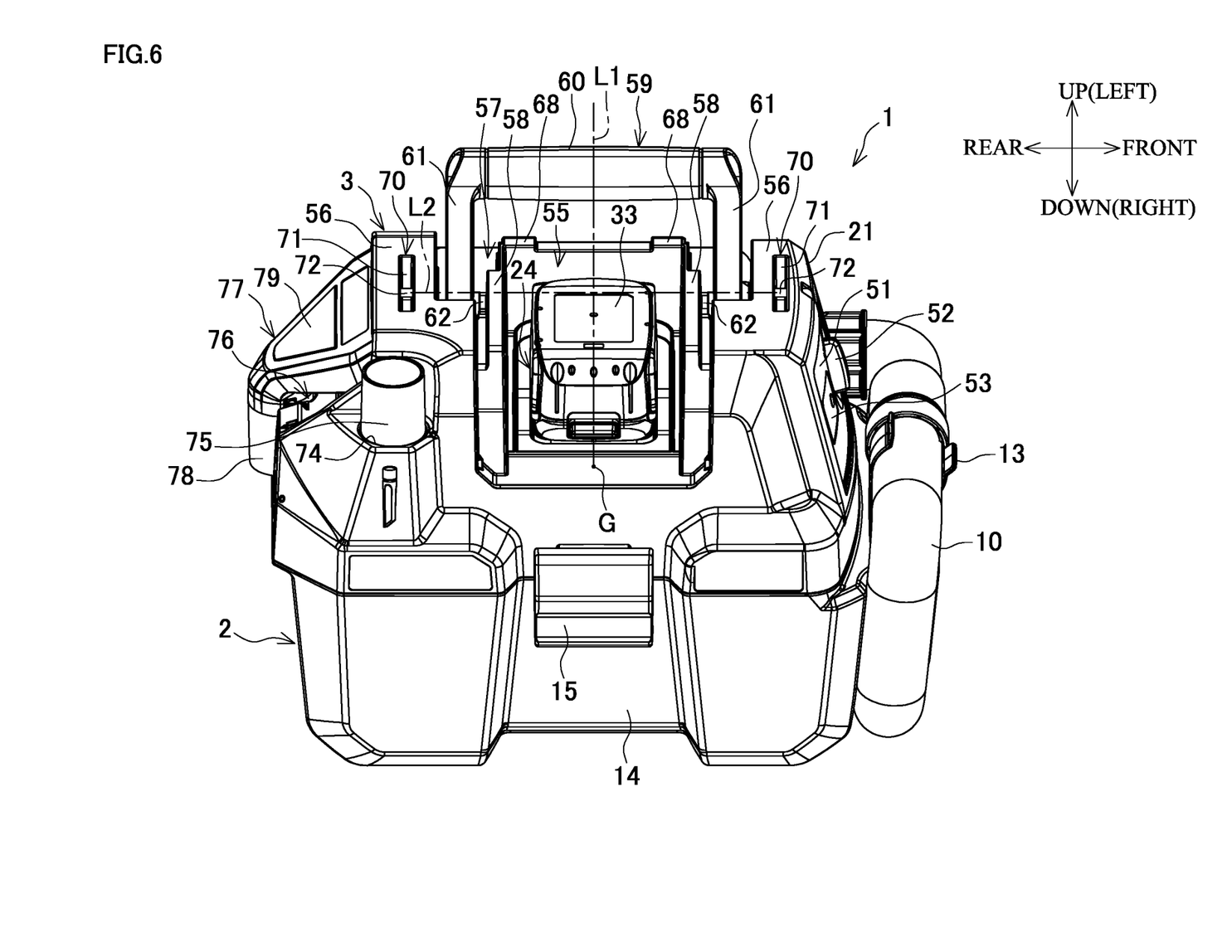
FIG. 6 is a perspective view of the box-type dust collector according to the first embodiment with a cover removed.

As illustrated in FIG. 6, a housing recessed portion 55 that opens the upper side and the right side of the battery mount portion 24 is formed at the center, in the front-rear direction, of the top cover 21 and on the upper side of the battery mount portion 24 of the bottom cover 20. The housing recessed portion 55 enables the battery pack 33 to be slid from the right side to be mounted to the battery mount portion 24. Top portions 56, 56, which are flat surfaces at the same height, are formed on the upper surface of the top cover 21 on the front and rear sides of the housing recessed portion 55. A handle accommodation portion 57 having a stepped surface positioned at a lower surface than a top surface of the top portions 56 is formed continuously so as to surround the housing recessed portion 55 on the left side and the front and rear sides as viewed in plan. A pair of partition walls 58, 58 with a height that is less than that of the top portions 56 are formed between the handle accommodation portion 57 and the housing recessed portion 55 to separate the handle accommodation portion 57 and the housing recessed portion 55 from each other.

A handle 59 is disposed in the handle accommodation portion 57. The handle 59 is composed of a grip portion 60 and a pair of leg portions 61, 61. The grip portion 60 extends in the front-rear direction to be housed on the left side in the handle accommodation portion 57. The pair of leg portions 61, 61 are formed integrally with the front and rear ends of the grip portion 60 to be housed on the front and rear sides in the handle accommodation portion 57. The handle 59 is rotatably coupled to the body 3 at the center of the body 3 in the right-left direction, with shaft portions 62, 62, which are provided at the respective base ends of the leg portions 61, 61 to face each other, fitted with receiving holes (not illustrated) provided in the partition walls 58, 58.

Hence, the handle 59 can be selectively at one of a fallen position and an upright position. At the fallen position, the handle 59 is accommodated in the handle accommodation portion 57 and does not project upward with respect to the top portions 56 as illustrated in FIGS. 1 and 4. The upright position, the handle 59 projects upward from the handle accommodation portion 57 as illustrated in FIGS. 2 and 6. When the handle 59 is at the upright position, the grip portion 60 extends in the front-rear direction directly over the battery pack 33 which is mounted to the battery mount portion 24. When the battery pack 33 is mounted, a center of gravity G of the entire dust collector 1 is positioned directly under the handle 59 at the upright position (on a line L1, indicated by the dot-and-dash line in FIGS. 2, 4, and 6, that extends in the vertical direction and that passes through the center, in the front-rear direction and the right-left direction, of the grip portion 60). A finger insertion portion 63 that facilitates drawing the handle 59 to the upright position is formed to extend from the left end of the handle accommodation portion 57 to a side surface of the top cover 21.

The housing recessed portion 55 is provided with a cover 64. As illustrated in FIGS. 1 and 2, the cover 64 has an upper plate portion 65 that covers the upper side of the housing recessed portion 55. A side plate portion 66 covers the right side of the housing recessed portion 55. A pair of arm portions 67, 67 are provided on the front and rear sides of the lower surface of the upper plate portion 65. The arm portions 67, 67 are coupled to bearing portions 68, 68 provided at the end edge of the inner side of the handle accommodation portion 57 so as to be rotatable through a shaft 69 that extends in the front-rear direction. Hence, the cover 64 can be opened and closed between a closed position in FIGS. 1, 2, and 4, and an open position. At the closed position, the housing recessed portion 55 is closed with the upper plate portion 65 positioned continuously with and at the same height as the top portions 56, 56 and with the side plate portion 66 positioned continuously with the right side surface of the top cover 21. At the open position, the housing recessed portion 55 is opened as illustrated in FIG. 6 with the cover 64 flipped up about the shaft 69. It should be noted, however, that operation to open the cover 64 can be performed only in the case where the handle 59 is at the fallen position. In FIG. 6, the cover 64 is not illustrated, in order to show the inside of the housing recessed portion 55.

The top portions 56, 56 on the front and rear sides of the top cover 21 are provided with coupling portions 70, 70 for a shoulder belt 80, to be discussed later. As illustrated in FIG. 4, the coupling portions 70 are composed of bottomed holes 71 and pins 72. The bottomed holes 71 are formed on the front and rear sides of the handle accommodation portion 57 to extend in the right-left direction. The pins 72 are provided on the upper side in the bottomed holes 71 to extend in the front-rear direction. As with the shaft portions 62, 62 of the handle 59, the pins 72, 72 on the front and rear sides are disposed at the center, in the right-left direction, of the body 3. A line L2, indicated by the dot-and-dash line, that extends in the front-rear direction and that passes through the axis of the pins 72, 72 is orthogonal to the line L1 which extends in the up-down direction and which passes through the center of gravity G. The pins 72, 72 are positioned point-symmetrically on the front and rear sides about the line L1 as viewed in plan.

A cover portion 73 that covers the suction tube 7, excluding the suction port 8, from the upper side is formed on the front left side of the top cover 21. An insertion port 74 that opens upward is formed on the rear right side of the top cover 21. A suction nozzle 75 in a flat linear shape can be inserted into the insertion port 74 from the upper side to be accommodated.

A housing portion 76 for a wide-open nozzle 77 that includes a wide-open suction portion 79 at the distal end of a tubular portion 78 is recessed in the rear surface of the top cover 21. The housing portion 76 allows to house the wide-open nozzle 77 in a tilted attitude with the tubular portion 78 on the lower side and with the suction portion 79 tilted toward the top cover 21.

The dust collector 1 configured as described above can be placed in a stationary manner on a floor surface or the like with the body 3 placed on the tank 2 and coupled thereto using the latches 15, 15 and with the battery pack 33 mounted to the battery mount portion 24.

Next, when the operation dial 52 is rotationally operated to operation 1 or operation 2, the brushless motor 36 is driven to rotate the rotary shaft 39, which rotates the air blowing fan 44. Due to a sucking force generated in the suction port 8, the suction nozzle 75 or the wide-open nozzle 77, which is connected to the distal end of the dust collection hose 10 coupled to the suction port 8, sucks outside air together with dust. The suctioned outside air enters the tank 2 from the suction tube 7, passes through the filter 26 to flow into the fan housing portion 35 from the sucking port 45, and via the turning path 46 from the outer periphery of the air blowing fan 44 to be discharged from the exhaust port 47 to the outside of the body 3. Hence, when the outside air passes in the tank 2, relatively large dust falls into the tank 2 to be stored therein, and relatively small powder dust is separated by the filter 26 to fall down or adhere to the filter 26. The dust collection hose 10 may be connected to an electric power tool such as a circular saw, rather than being connected to the suction nozzle 75 or the wide-open nozzle 77, to directly suck powder dust generated from the electric power tool.

In the body 3, the motor cooling fan 40 is rotated to suction air from the cooling air inlet ports 41 of the motor housing portion 34. The suctioned air cools the brushless motor 36, and thereafter is discharged from the cooling air outlet ports 42. Convection of cooling air is caused in the body 3 by air that enters the body 3 from the cooling air inlet ports 41 and air that exits the body 3 from the cooling air outlet ports 42. The cooling air contacts the battery pack 33 to cool the battery pack 33.

In the case of transporting the dust collector 1, the handle 59 is rotated from the fallen position to the upright position, so that the dust collector 1 can be lifted and transported by grasping the grip portion 60. At this time, the center of gravity G of the dust collector 1 is positioned directly under the handle 59. Thus, the dust collector 1 can be carried in a well-balanced manner, and can be carried with ease.

Figure 7:
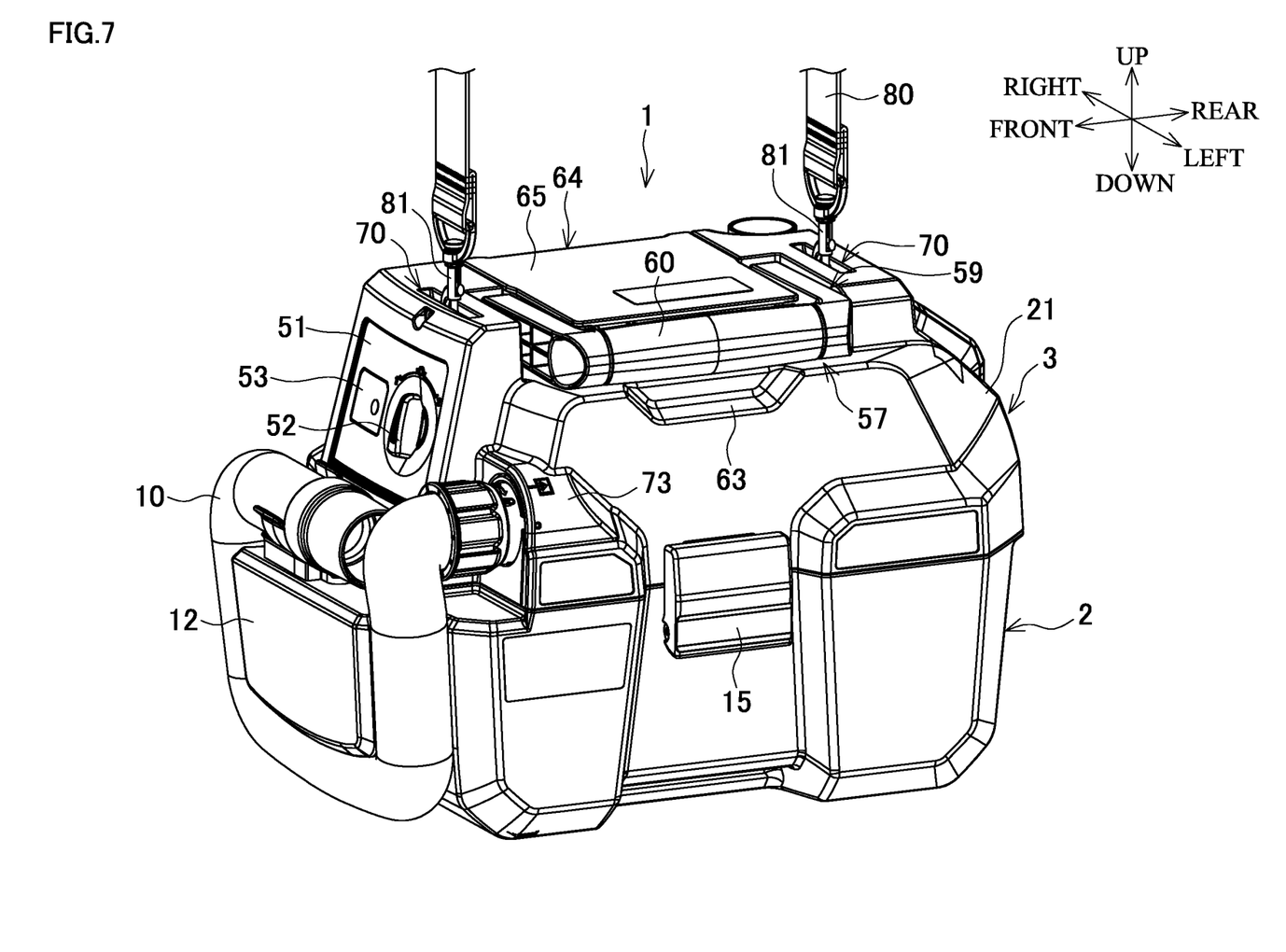
FIG. 7 is a perspective view of the box-type dust collector according to the first embodiment with a shoulder belt coupled thereto.

By coupling carabiners 81 or the like at both ends of the shoulder belt 80 to the pins 72, 72 of the coupling portions 70, 70 on the front and rear sides as illustrated in FIG. 7, the dust collector 1 can be transported while being suspended from the shoulder utilizing the shoulder belt 80, or can be operated in the suspended state. Also at this time, both ends of the shoulder belt 80 are positioned point-symmetrically with respect to the center of gravity G on the front and rear sides of the handle 59. Thus, the dust collector 1 can be suspended in a stable state, and is less likely to be tilted or swung unexpectedly.

As described above, with the dust collector 1 according to the embodiment described above, the handle 59 for carriage is provided at a position directly over the center of gravity G of the entire dust collector 1 with the battery pack 33 mounted to the battery mount portion 24. Further, the coupling portions 70, 70, to which both ends of the shoulder belt 80 are to be coupled, are provided at positions on the front and rear sides that are point-symmetric about the center of gravity G as viewed in plan. Thus, the dust collector 1 can be carried in a well-balanced manner utilizing the handle 59 or the shoulder belt 80 even if the battery pack 33 is used as the power source, which provides high workability.

In particular, the battery pack 33 can be cooled with cooling air from the motor cooling fan 40 which is provided on the rotary shaft 39 of the brushless motor 36. Thus, the battery pack 33 can be cooled efficiently utilizing cooling air from the brushless motor 36.

Second Embodiment

Next, a dust collector according to a different embodiment will be described. It should be noted, however, that components that are the same as those according to the first embodiment are given the same reference numerals to omit redundant description.

Figure 8:
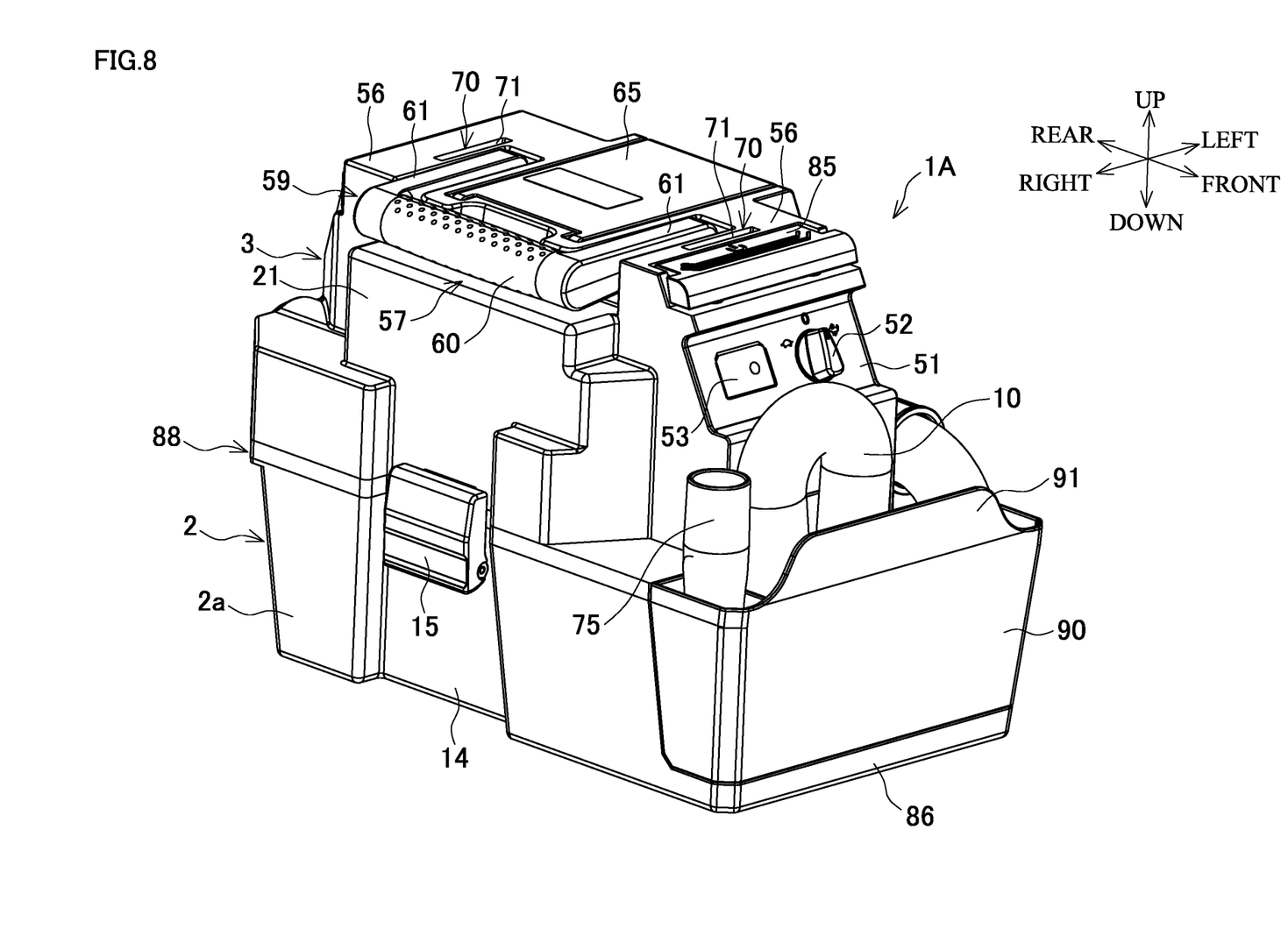
FIG. 8 is a perspective view of a box-type dust collector according to a second embodiment.
Figure 9:
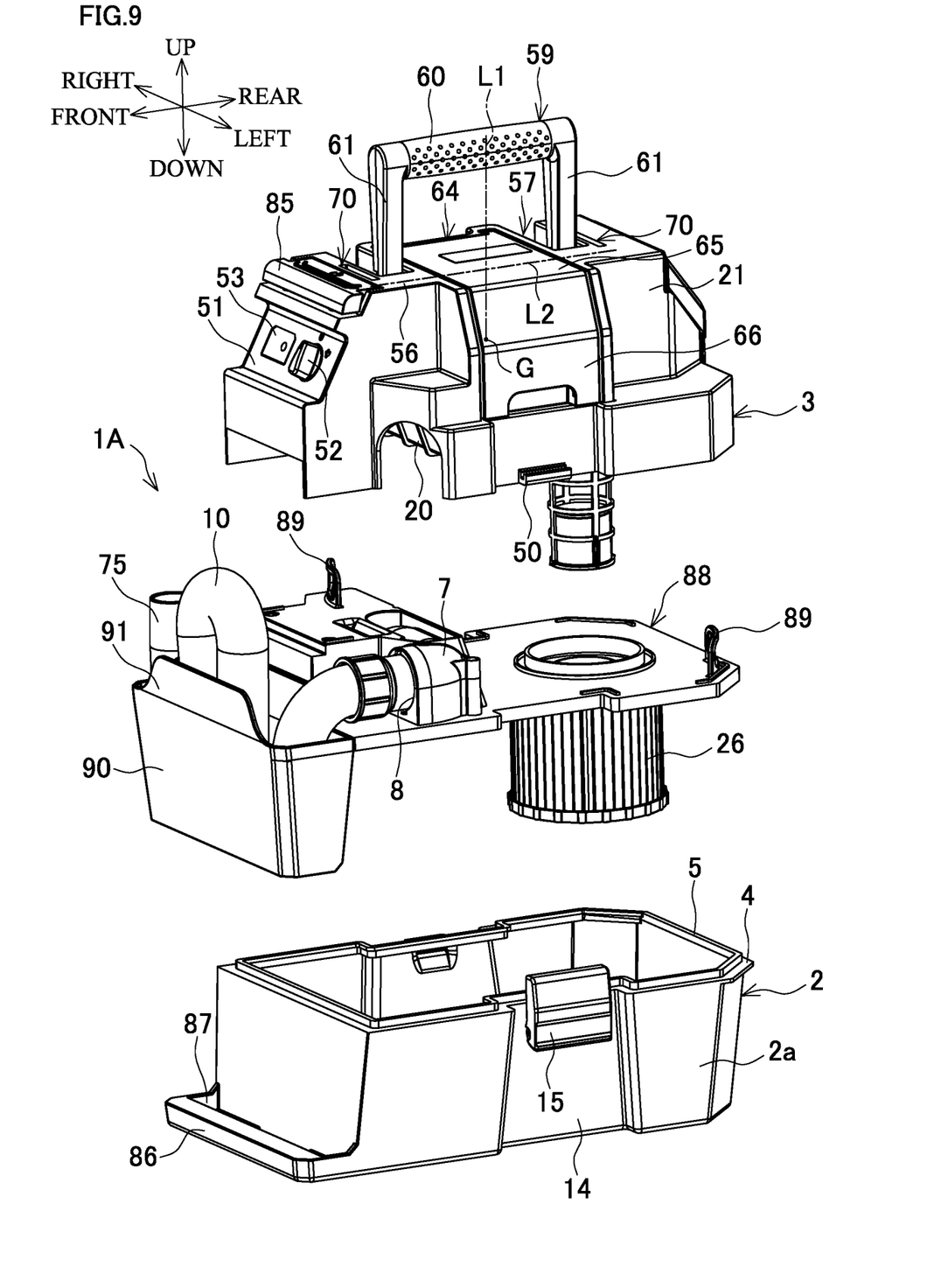
FIG. 9 is an exploded perspective view of the box-type dust collector according to the second embodiment.

In a dust collector 1A illustrated in FIGS. 8 and 9 as well as the same as the dust collector 1 according to the first embodiment, the handle 59 for carriage and the coupling portions 70, 70 are provided at a position directly over the center of gravity G of the entire dust collector 1A with the battery pack 33 mounted and at positions on the front and rear sides that are point-symmetric about the center of gravity G as viewed in plan. The coupling portions 70, 70 are coupled to both ends of the shoulder belt 80. However, the handle 59 and the cover 64 are inverted in the right-left direction compared to the dust collector 1.

The dust collector 1A differs from the dust collector 1 in that a switch button 85 is provided on the top cover 21 of the body 3 at the top portion 56 on the front side. The switch button 85 is provided on the upper side of the operation panel 51. The switch button 85 is in the shape of a plate extending in the right-left direction and supported by a hinge (not illustrated) at the rear end of the switch button 85 so as to be swingable in the up-down direction. The switch button 85 is biased by a spring (not illustrated) toward an upper limit position at which the upper surface of the switch button 85 is at the same height as the top portion 56. The brushless motor 36 can be driven by turning on a switch (not illustrated) by an operation to push the switch button 85 downward.

Figure 10:
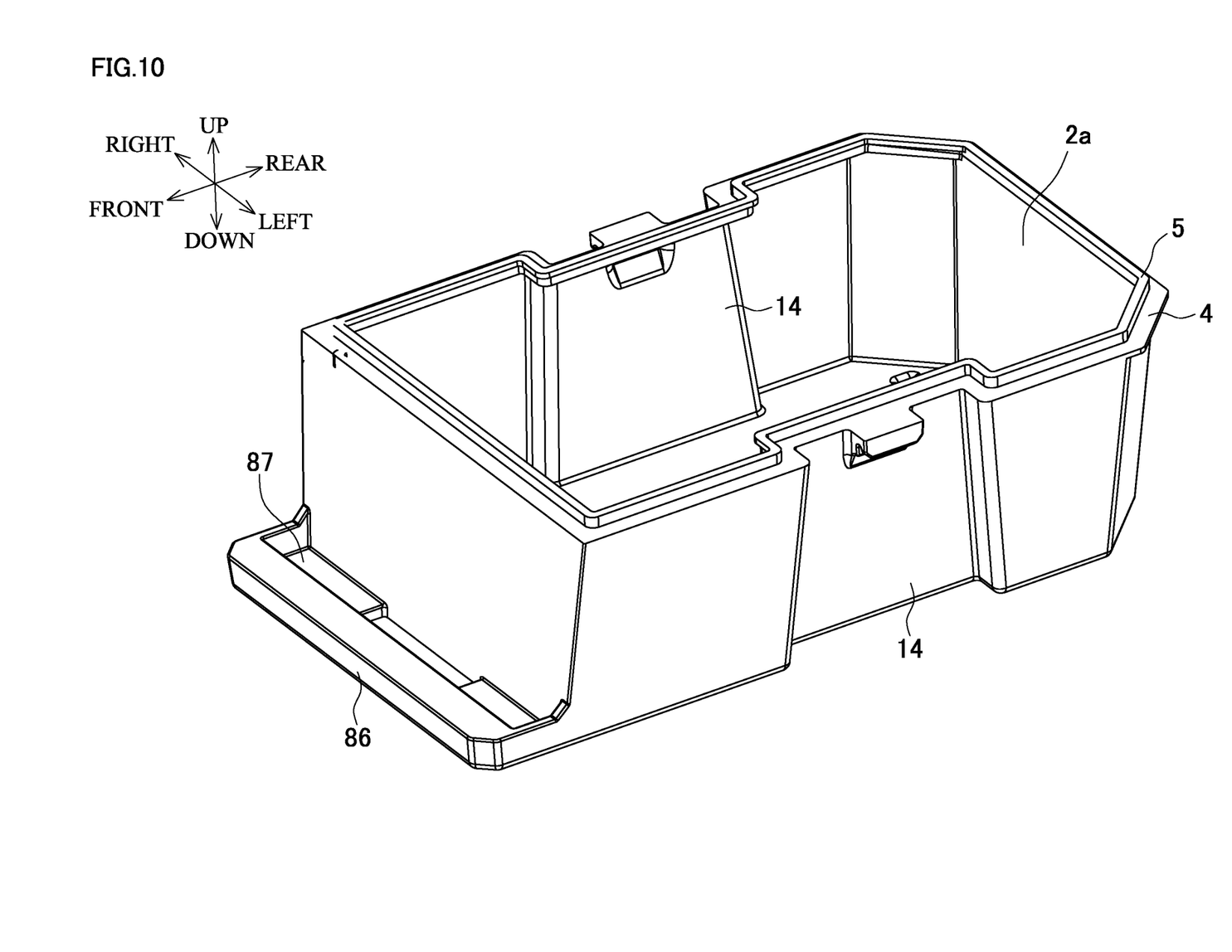
FIG. 10 is a perspective view of a tank body.

In the tank 2, a grip 86 that projects forward is provided on the front surface of the tank body 2a. The grip 86 is formed integrally with the tank body 2a with the bottom surface of the grip 86 continuous with the bottom surface of the tank body 2a. The width, in the right-left direction, of the grip 86 is the same as the width, in the right-left direction, of the tank body 2a. As illustrated in FIG. 10, a fitting recessed portion 87 that is recessed is formed in the upper surface of the grip 86 except at the front end and the right and left ends of the grip 86.

In the dust collector 1A, an intermediate plate 88 is provided between the tank 2 and the body 3, and the suction tube 7 and the filter 26 are provided on the intermediate plate 88. A pair of knobs 89, 89 are provided diagonally on the front and rear sides on the upper surface of the intermediate plate 88 to extend upward. A pocket 90 that houses the dust collection hose 10 and the suction nozzle 75 which are connected to the suction tube 7 is coupled to the front end of the intermediate plate 88.

The pocket 90 is a deep bottomed body that is longer in the right-left direction, that opens at the same height as the upper surface of the intermediate plate 88, and that projects downward with respect to the intermediate plate 88. When the intermediate plate 88 is placed on the upper surface of the tank 2, the bottom portion of the pocket 90 is fitted with the fitting recessed portion 87 of the grip 86 to be supported as illustrated in FIG. 8. At this time, the front surface of the pocket 90 is continuous with the front surface of the grip 86, and the right and left side surfaces of the pocket 90 are continuous with the right and left side surfaces of the tank body 2*a* and the grip 86. A projecting piece 91 that projects upward with respect to the opening of the pocket 90 is provided at the front end of the opening thereof.

Figure 11:
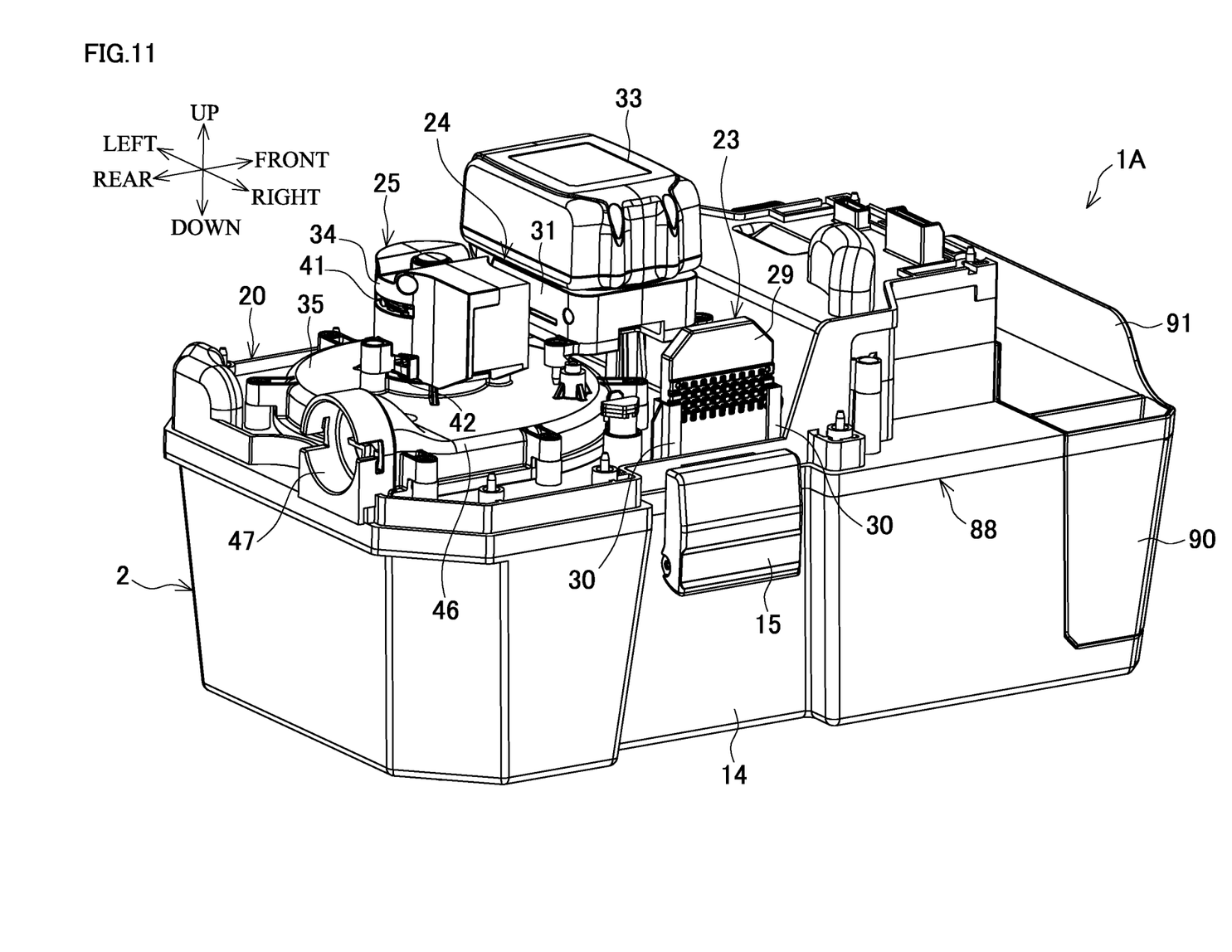
FIG. 11 is a perspective view of the box-type dust collector according to the second embodiment with a top cover removed.

On the bottom cover 20 of the body 3, as illustrated in FIG. 11, the controller 23 is supported on the right side of the battery mount portion 24, rather than on the front side, to extend vertically along a plane defined in the front-rear direction and the up-down direction.

The dust collector 1A configured as described above can be placed in a stationary manner on a floor surface or the like with the body 3 placed on the tank 2 via the intermediate plate 88 and coupled thereto using the latches 15, 15 and with the battery pack 33 mounted to the battery mount portion 24.

Next, when the operation dial 52 is rotationally operated or the switch button 85 is operated to be pushed down, the brushless motor 36 is driven to rotate the rotary shaft 39, which rotates the air blowing fan 44. Then, due to a sucking force generated in the suction port 8, the suction nozzle 75 or the wide-open nozzle 77, which is connected to the distal end of the dust collection hose 10 coupled to the suction port 8, sucks outside air together with dust. The suctioned outside air enters the tank 2 from the suction tube 7, passes through the filter 26 to enter the fan housing portion 35 from the sucking port 45, and passes through the turning path 46 from the outer periphery of the air blowing fan 44 to be discharged from the exhaust port 47 to the outside of the body 3. Hence, when the outside air passes in the tank 2, relatively large dust falls into the tank 2 to be stored therein, and relatively small powder dust is separated by the filter 26 to fall down or adhere to the filter 26.

In the body 3, the motor cooling fan 40 is rotated to suction air from the cooling air inlet ports 41 of the motor housing portion 34. The suctioned air cools the brushless motor 36, and thereafter is discharged from the cooling air outlet ports 42. Convection of cooling air is caused in the body 3 by air that enters the body 3 from the cooling air inlet ports 41 and air that exits the body 3 from the cooling air outlet ports 42. The cooling air contacts the battery pack 33 and the controller 23 to cool the battery pack 33 and the controller 23.

In the case of transporting the dust collector 1A, the handle 59 is rotated from the fallen position to the upright position, so that the dust collector 1A can be lifted and transported by grasping the grip portion 60. At this time, the center of gravity G of the dust collector 1A is positioned directly under the handle 59. Thus, the dust collector 1A can be carried in a well-balanced manner, and can be carried with ease.

By coupling carabiners 81 or the like at both ends of the shoulder belt 80 to the pins 72, 72 of the coupling portions 70, 70 on the front and rear sides, the dust collector 1A can be transported while being suspended from the shoulder utilizing the shoulder belt 80, or can be operated in the suspended state. Also at this time, both ends of the shoulder belt 80 are positioned on the front and rear sides of the handle 59. Thus, the dust collector 1A can be suspended in a stable state, and is less likely to be tilted or swung unexpectedly.

The pocket 90 is supported by the grip 86 of the tank 2. Thus, the pocket 90 is not swung or rattled unexpectedly.

As described above, also with the dust collector 1A according to the second embodiment, the handle 59 for carriage is provided at a position directly over the center of gravity G of the entire dust collector 1A with the battery pack 33 mounted to the battery mount portion 24, and the coupling portions 70, 70, to which both ends of the shoulder belt 80 are to be coupled, are provided at positions on the front and rear sides that are point-symmetric about the center of gravity G as viewed in plan. Thus, the dust collector 1A can be carried in a well-balanced manner utilizing the handle 59 or the shoulder belt 80 even if the battery pack 33 is used as the power source, which provides high workability.

In particular, the tank 2 is provided with the grip 86 which projects outward and which can support the dust collection hose 10 which is connected to the suction port 8. Thus, the grip 86 which is provided to the tank 2 can be utilized to accommodate the dust collection hose 10, which achieves a reasonable configuration.

The battery pack 33 and the controller 23 can be cooled with cooling air from the motor cooling fan 40 which is provided on the rotary shaft 39 of the brushless motor 36. Thus, the battery pack 33 and the controller 23 can be cooled efficiently utilizing cooling air from the brushless motor 36.

The intermediate plate 88 is interposed between the tank 2 and the body 3. Thus, the opening of the tank 2 is not immediately opened when the body 3 is lifted, and the intermediate plate 88 can maintain the closed state. Hence, scattering of dust due to removal of the body 3 is suppressed. The intermediate plate 88 is easily removable using the knob 89, and dust in the tank 2 can be easily discarded utilizing the grip 86 which is provided to the tank body 2*a*. Therefore, the presence of the intermediate plate 88 does not obstruct the workability of discarding dust.

Modifications that are common to the first and second embodiments described above will be described below.

The overall shape of the dust collector is not limited to a rectangular shape as viewed in plan, and may be a different shape such as a square shape or a circular shape as viewed in plan.

Both the handle and the coupling portions for the shoulder belt may not be provided, and only either of the handle or the coupling portions for the shoulder belt may be provided so that the dust collector can be carried using the handle alone or the shoulder belt alone.

The handle may not be provided directly over the center of gravity, and a plurality of handles may be provided at positions (e.g. on the front and rear sides) that are point-symmetric about the center of gravity.

The positions of the coupling portions for the shoulder belt are not limited to those according to the embodiments described above, and the coupling portions for the shoulder belt may be provided diagonally, for example.

The direction of insertion of the battery pack is not limited to the right-left direction, and may be the front-rear direction or the up-down direction.

The position of the battery mount portion may be changed, and a plurality of battery packs may be mounted to the battery mount portion.

The cover for the housing recessed portion may be omitted.

The motor is not limited to the brushless motor, and a commutator motor or the like may also be used.

The dust separation portion may be provided with a pre-filter in a bag shape provided upstream of the filter, and a cyclone system may be adopted in place of the filter.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A box-shaped dust collector comprising:
    a suction unit that includes a motor and an air blowing fan;
    a battery mount portion configured to receive and engage a battery that serves as a power source;
    a suction port configured to suction outside air through rotation of the air blowing fan;
    a separation portion configured to separate dust from the outside air which is suctioned by the suction port;
    an outer housing that (1) houses the suction unit and the separation portion, (2) has a bottom surface that is configured to be placed on an object that supports the box-shaped dust collector and (3) has a top surface opposite to the bottom surface; and
    a handle rotatably connected to the outer housing and being at a position directly over a center of gravity of the entire box-shaped dust collector with the battery mounted to the battery mount portion or at a position that is point-symmetric about the center of gravity when viewed in plan,
    wherein:
    the top surface has a recessed portion extending toward the bottom surface;
    the recessed portion includes a recessed portion bottom surface; and
    the recessed portion bottom surface includes the battery mount portion.

2. The box-shaped dust collector according to claim 1, further comprising a shoulder belt, wherein:
    the outer housing includes two spaced shoulder belt coupling portions;
    an end of the shoulder belt is coupled to each of the shoulder belt coupling portions; and
    the shoulder belt coupling portions are provided at positions that are point-symmetric about the center of gravity as viewed in plan.

3. The box-shaped dust collector according to claim 1, further comprising:
    a tank that includes the bottom surface and that stores the dust which is separated by the separation portion; and
    a body placed on the tank and including the suction unit and the battery mount portion, wherein:
    the tank is provided with a grip that projects outward so as to support a dust collection hose to be connected to the suction port; and
    the grip has curved surfaces that mate with an outer periphery of the dust collection hose.

4. The box-shaped dust collector according to claim 3, wherein
    the body includes a controller that controls drive of the motor, and the controller is cooled with cooling air from a motor cooling fan provided on a rotary shaft of the motor.

5. The box-shaped dust collector according to claim 3, wherein
    the handle includes a linear grip portion and a pair of leg portions formed integrally with both ends of the grip portion, lower ends of the leg portions are coupled to the body so as to be rotatable, and the grip portion is positioned directly over the center of gravity when the leg portions are at upright positions.

6. The box-shaped dust collector according to claim 5, wherein
    the tank is formed as a deep bottomed half box body with an opening in an upper surface, the body has a bottom cover placed at an upper end of the tank and a top cover assembled to the bottom cover from an upper side, and the top cover is provided with a handle accommodation portion that accommodates the handle at a fallen position.

7. The box-shaped dust collector according to claim 6, wherein
    the top cover is provided with a finger insertion portion that facilitates drawing out the handle to an upright position.

8. The box-shaped dust collector according to claim 6, wherein
    the battery mount portion is provided on the bottom cover, and the top cover is provided with a housing recessed portion that opens the battery mount portion.

9. The box-shaped dust collector according to claim 8, wherein
    the top cover is provided with a cover that opens and closes the housing recessed portion.

10. The box-shaped dust collector according to claim 9, wherein
    the cover is allowed to open the housing recessed portion only in a case where the handle is at the fallen position.

11. The box-shaped dust collector according to claim 2, wherein
    a pair of the coupling portions are provided with the handle interposed between the coupling portions.

12. The box-shaped dust collector according to claim 11, wherein
    the coupling portions each includes a bottomed hole and a pin provided to extend in the bottomed hole.

13. The box-shaped dust collector according to claim 12, wherein
    the pin is disposed on a line that is orthogonal to a line that extends in an up-down direction and that passes through the center of gravity.

14. The box-shaped dust collector according to claim 3, wherein
    an intermediate plate that supports the separation portion is provided between the tank and the body, the intermediate plate is provided with a pocket that houses the dust collection hose, and the pocket is supported as fitted with the grip.

15. The box-shaped dust collector according to claim 4, wherein
    the controller is supported vertically in the body.

16. The box-shaped dust collector according to claim 1, wherein
    the separation portion is a tubular filter.

17. The box-shaped dust collector according to claim 1, wherein
the battery is slid from a side to be mounted to the battery mount portion.

* * * * *